United States Patent [19]

Ryder et al.

[11] Patent Number: 4,751,617
[45] Date of Patent: Jun. 14, 1988

[54] PHOTO-OPTIC COLLECTOR

[75] Inventors: Francis E. Ryder; Stephen P. Lisak, both of Arab, Ala.

[73] Assignees: Textron Inc., Providence, R.I.; Ryder International Corporation, Arab, Ala.

[21] Appl. No.: 939,056

[22] Filed: Dec. 8, 1986

[51] Int. Cl.⁴ .................. B60Q 1/12; G03B 15/02
[52] U.S. Cl. ........................................ 362/61; 362/5; 362/32
[58] Field of Search .............. 362/61, 5, 32; 358/901

[56] References Cited

U.S. PATENT DOCUMENTS

| | | | |
|---|---|---|---|
| 2,915,659 | 12/1959 | Goodman | 358/901 X |
| 3,192,390 | 6/1965 | Ressler | 358/901 X |
| 4,618,884 | 10/1986 | Nagasaki | 358/901 X |

FOREIGN PATENT DOCUMENTS 126391  7/1984  Japan .................. 358/901

OTHER PUBLICATIONS

1 Sheet of Drawings: "Composite Headlamp (LH) 5974243", 1985.
1 Sheet of Drawings: "Composite Headlamp Assembly-76C001", 1985.
1 Sheet of Partial Drawing No. 16506233, "Photo-Optic Collector", 1985.

Primary Examiner—Larry Jones
Attorney, Agent, or Firm—Trexler, Bushnell, Giangiorgi & Blackstone, Ltd.

[57] ABSTRACT

A photo-optic collector assembly for use with an automobile headlamp assembly or the like comprises a collector member for receiving and redirecting light outwardly of the automobile headlamp assembly, a mounting member for engaging the collector member and for removably mounting the collector member to extend through a mounting aperture in the headlamp assembly, and a gasket member engageable intermediate a portion of the mounting member and the headlamp assembly for forming a substantially watertight seal about the mounting aperture. The collector member and the mounting member include cooperating assembly portions for initially engaging the collector member and mounting member in a preassembled condition for shipping and handling thereof and for thereafter mounting the collector member to the mounting member and assembling the mounting member to the headlamp assembly, respectively, in a fully assembled condition.

17 Claims, 2 Drawing Sheets

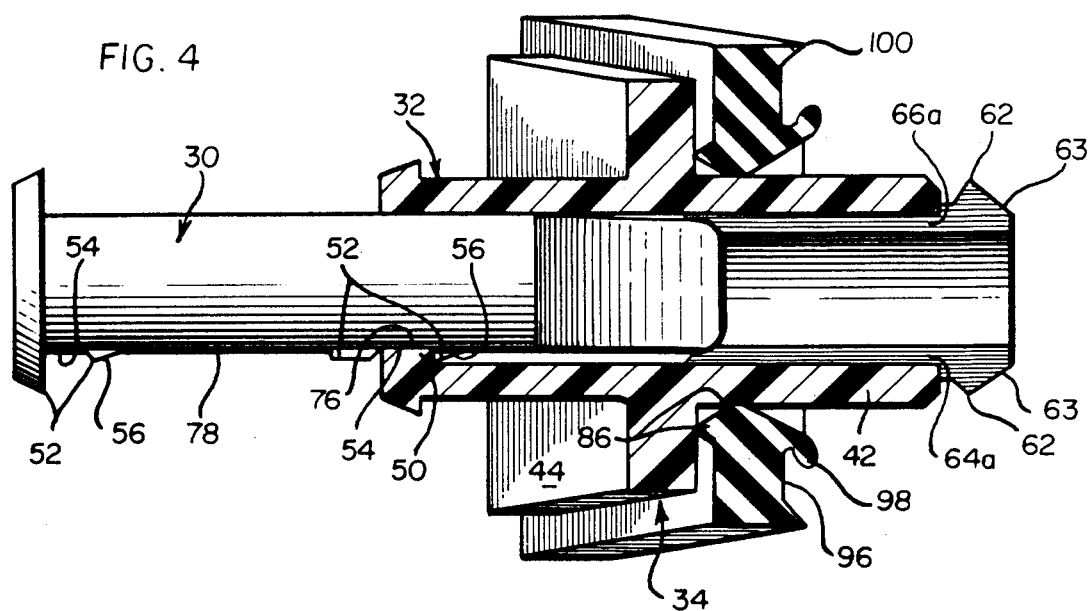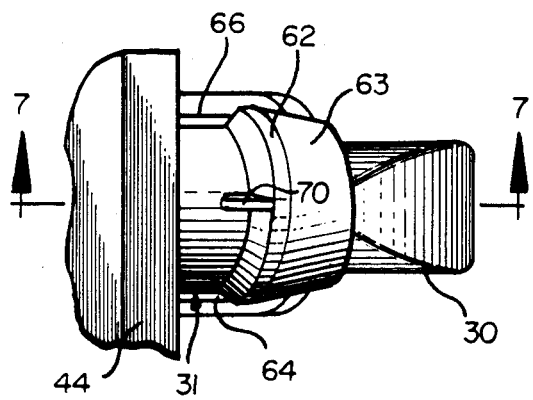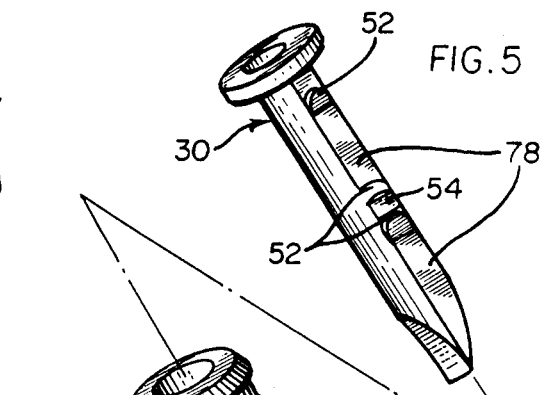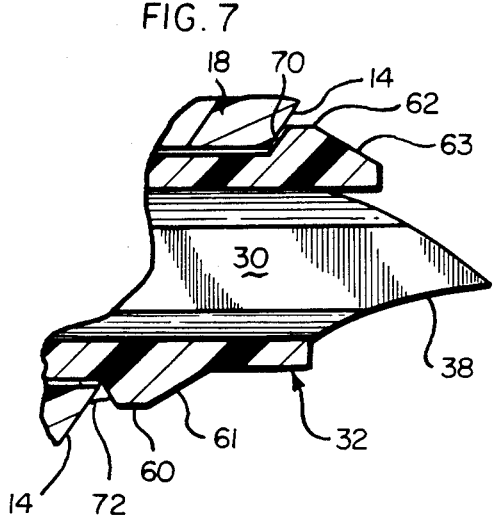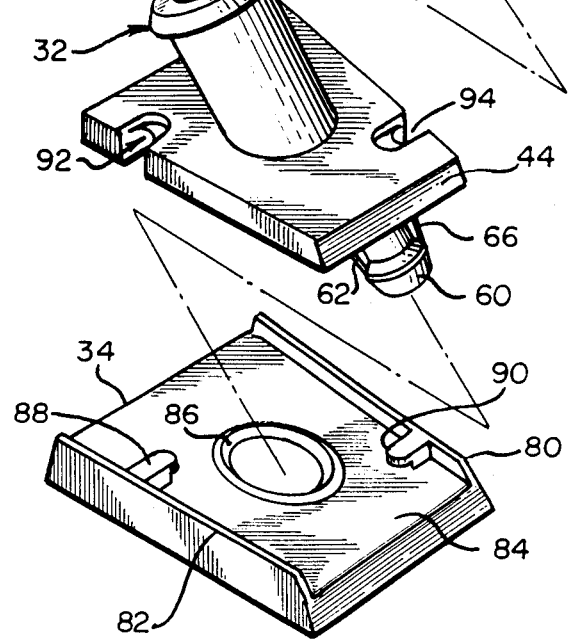

PHOTO-OPTIC COLLECTOR

BACKGROUND OF THE INVENTION

This invention is directed generally to improvements in automotive headlamp assemblies, and more particularly to a novel and improved photo-optic collector assembly for use in an automobile headlamp assembly or the like.

Some automobiles or other vehicles equipped with headlamps additionally provide some system to indicate or verify headlamp operation to the driver or operator. That is, when a headlamp is lighted, or if a headlamp fails to light when energized, a suitable indication or display will be given on the dashboard or in some other location visible to the driver or operator.

One such headlamp indicator system positions a photo-optic guideway or conductor with a receiving end thereof positioned for picking up light from an operating headlamp. The receiving end may be positioned within the headlamp housing itself, or at some other convenient location. Generally, the inlet or receiving end is suitably arranged to respond substantially only to light from a properly illuminated headlamp, and not to ambient light conditions or the like. The photo-optic guideway or conductor is extended to any suitable viewing point, for generally conducting the light from a properly illuminated headlamp to a convenient point of observation by the driver or operator. Such point of observation may be on some point exteriorly of the vehicle, perhaps adjacent the headlamp itself, but oriented so as to face the driver or operator, or indeed the photo-optic conductor may be extended as far as a suitable dashboard indicator panel or the like, if desired.

In the above photo-optic arrangement, proper illumination of the headlamp or other lamp will cause corresponding illumination of the driver-observable end of the photo-optic conductor. On the other hand, a failure of the lamp to illuminate properly will result in corresponding absence of illumination of the observable end of the photo-optic conductor.

While a number of assemblies and arrangements for achieving the desired mounting of the collector or intake end of the photo-optic conductor relative to the headlamp have been proposed, there is room for further improvement. In this regard, exisiting headlamp housings generally present curved or parabolic interior reflector surfaces and generally corresponding parabolic or similarly curved exterior surfaces. Generally speaking, it is desired to mount a photo-optic collector or receiver portion of the photo-optic system through a mounting aperture in the headlamp housing itself so as to be closely adjacent the bulb or filament of the lamp. However, existing headlamps present a great variety of differing curvatures and configurations of both external and internal surfaces, making reliable orientation and mounting of any given photo-optic collector assembly relatively difficult.

More significantly, it is important to maintain a watertight seal about the mounting aperture, to prevent the ingress of water, moisture or the like from damaging or destroying the filament or other internal headlamp components. Heretofore, it has been proposed to utilize a quantity of epoxy or similar adhesive and/or sealant materials to achieve the desired sealing between the photo-optic collector and the headlamp housing aperture. However, such sealing is difficult to reliably achieve and maintain using this approach.

Additionally, it is important during assembly to properly orient the collector or inlet end of the photo-optic system or conductor, relative to the lamp or filament of the headlamp, to assure optimal response. As an additional matter, when separate mounting and/or sealing pieces are utilized, it is important to properly orient the mounting and/or sealing piece relative to the photo-optic member or collector, to assure both proper orientation of the collector inlet relative to the light source and to assure proper orientation for reliable sealing of the sealing member or gasket.

Moreover, in a multiple piece assembly of the foregoing type, it is important that the assembler on a high volume automotive assembly line be required to perform as few operations as possible to assure the shortest possible time required for assembling automotive components and/or subassemblies of this type. Accordingly, it is important that a good supply of all the necessary parts be available, and that parts be preassembled when possible to minimize or optimize the labor time and consequent cost in assembling the components.

Advantageously, we have developed a novel and improved photo-optic collector assembly which addresses the foregoing considerations and concerns and overcomes the foregoing problems.

Our novel and improved photo-optic collector assembly includes a collector member for receiving and redirecting light outwardly of an automobile headlamp assembly or the like, a mounting member for engaging the collector member and for removably mounting the collector member to extend through a mounting aperture in the headlamp assembly, and a gasket member engageable intermediate a portion of the mounting member and the headlamp assembly or the like for forming a substantially watertight seal about the mounting aperture. The collector member and mounting member include cooperating assembly means for initially engaging the collector member with the mounting member in a preassembled condition for shipping and handling thereof, and for thereafter mounting the collector member to the mounting member and assembling the mounting member to the headlamp assembly in a fully assembled condition.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of drawings in which like reference numerals identify like elements, and in which:

FIG. 4 is a view similar to FIG. 3, illustrating a preassembled condition assembly of the photo-optic collector assembly of the invention;

FIG. 5 is a reduced, exploded perspective view, illustrating assembly of a photo-optic collector assembly embodying further features in accordance with an alternate form of the invention;

FIG. 6 is a partial view of an end portion of a photo-optic collector, illustrating a further feature in accordance with yet a further alternate embodiment of the invention; and FIG. 7 is a sectional view taken generally in the plane of the line 7—7 of FIG. 6 and illustrating assembly of the photo-optic collector assembly thereof with a mounting aperture of a headlamp assembly.

DETAILED DESCRIPTION OF THE ILLUSTRATED EMBODIMENT

Figure 1:
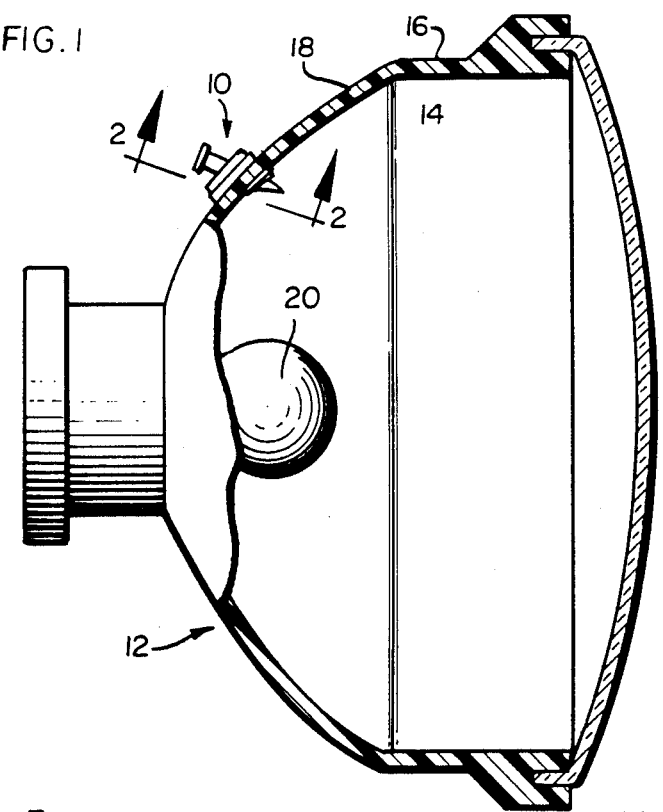
FIG. 1 is a side elevation of an automotive or similar headlamp assembly, partially broken away and partially in section, illustrating generally the mounting of a photo-optic collector assembly in accordance with the invention thereto.
Figure 3:
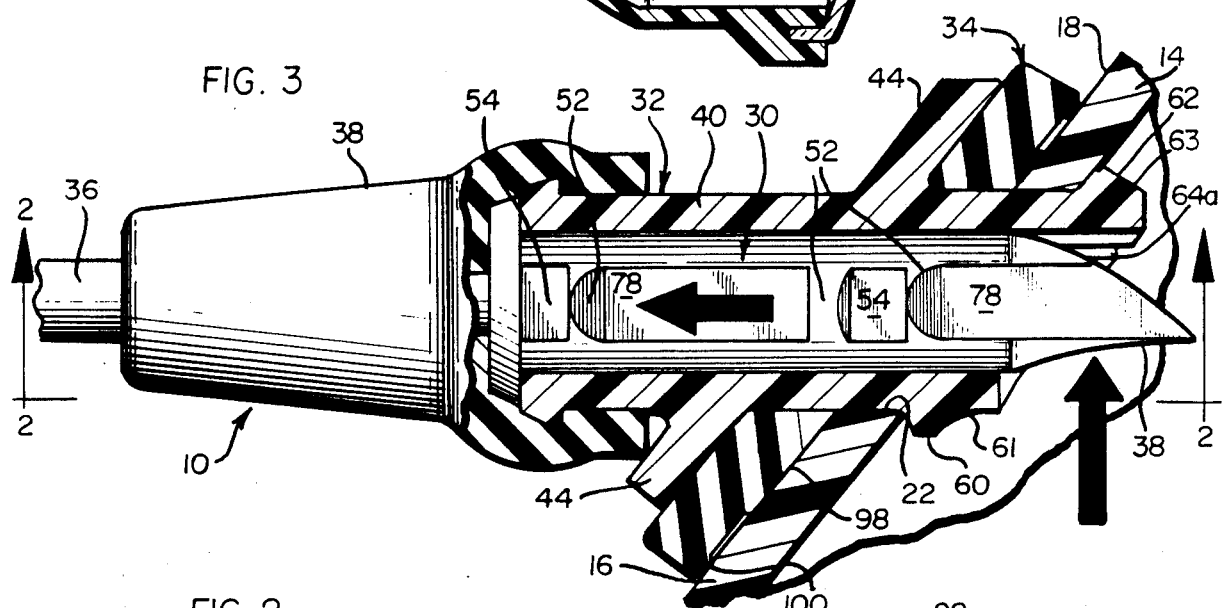
FIG. 3 is a developmental view taken generally along the line 3—3 of FIG. 2.
Figure 2:
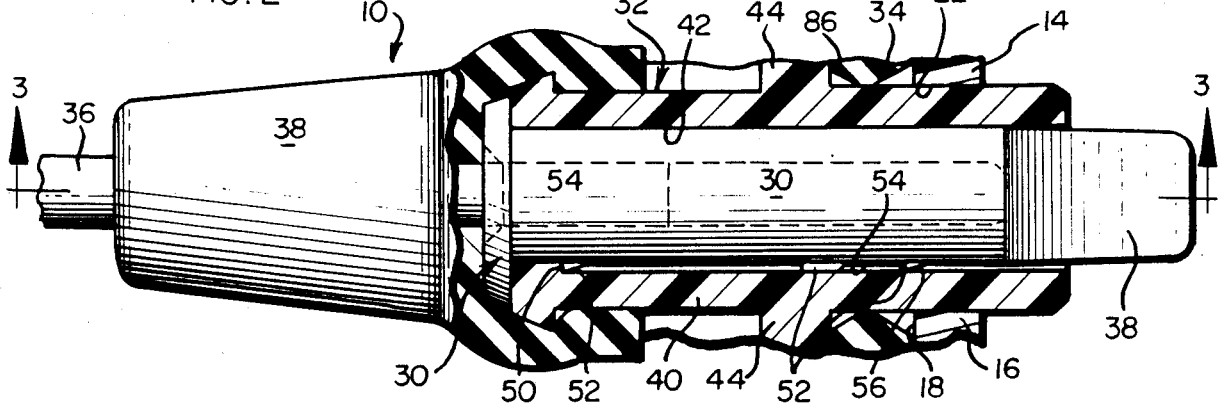
FIG. 2 is a greatly enlarged developmental view taken generally along the line 2—2 of FIG. 1.

Referring now to the drawings, and initially to FIGS. 1 through 3, a novel and improved photo-optic collector assembly for use in an automotive headlamp assembly is designated generally by the reference numeral 10. The headlamp assembly is designated generally by the reference numeral 12. The headlamp assembly 12 generally includes a curved and preferably parabolic reflector surface 14 which is often formed on a similarly curved interior wall surface of a housing member 16 which thus also defines a similarly curved or parabolic exterior surface 18. The headlamp assembly 12 usually forms a sealed enclosure for a bulb or filament element somewhat schematically indicated at 20. Other portions of the headlamp assembly are not relevant to the present invention and will not be described further herein.

Suffice it to say that the photo-optic collector assembly 10 of the invention is configured for extending through and sealingly engaging with a mounting aperture 22 (see FIG. 2) in the headlamp assembly which is formed through the curved or parabolic wall 16 thereof. Generally speaking, the photo-optic collector assembly 10 of the invention comprises a three-piece assembly, including a collector member 30, a mounting member 32, and a sealing member or gasket 34. These members are arranged for sealingly engaging the collector member 30 in a desired orientation relative to lamp 20 as it extends through the aperture 22. The collector member 30 is arranged to interfit with and transmit light energy to one end of an elongate light conductor member or fiber optic bundle 36. A suitable elastomeric or rubber fitting 38 is provided for sealingly engaging the assembly 10 with the collector 30 abutting the conductor 36; however, the conductor 36 and fitting 38 form no part of the present invention.

Referring now to the remaining figures of the drawings, the collector member 30 will be seen to comprise an elongate, generally cylindrical member 40 having an inner end or light collecting end formed in a generally prismatic or prism-like configuration 38. This prism-like end 38 is preferably oriented generally facing the lamp or filament 20 to optimize reception of light therefrom and to direct the received light axially back or upwardly along the body of the collector member 30 toward the conductor 36. The mounting member 32 includes a generally elongate, tubular, open-ended body 40 of complementary configuration for receiving the collector member therethrough. In this regard, a hollow tubular interior surface 42 of the mounting member 32 generally defines means for receiving and engaging the collector member and removably mounting the collector member extending through the mounting aperture 22. The mounting member 32 further includes a relatively enlarged, generally flat gasket-engaging surface portion 44 which extends generally transversely of tubular body 40 at an angle generally complementary with the curvature of headlamp housing surface 18. Hence the tubular body 40 and portion 44 define respective collector-receiving and gasket-engaging portions of the mounting member 32.

The gasket member 34 is engageable intermediate this gasket-engaging portion 44 of the mounting member and the outer wall surface 18 of the headlamp housing to thereby sealingly engage the mounting member and the collector member extending therethrough relative to the headlamp housing. Preferably, this engagement is such as to form a watertight seal about the mounting aperture 22.

In accordance with a feature of the invention, the collector member and mounting member respectively include first and second cooperating assembly means or structure. This assembly means or structure is arranged for engaging the two in a first or preassembled condition for shipping and handling as shown in FIG. 4, and in a second or fully assembled condition for mounting the collector to the mounting member and to the headlamp assembly in a fully assembled relation as shown in FIGS. 1-3. In the illustrated embodiment, these first and second cooperating assembly means or engaging means comprise interlocking tab or shoulder means 50, 52 and recess means 54, which are formed respectively on the mounting member and collector member as best viewed in FIG. 4. Preferably, the collector member is also provided with sloped or ramp-like lead-in surfaces 56 on leading ones of the shoulder or tabs 52, so as to guide the same into engagement with cooperating shoulder 50 of the mounting member for snapping engagement therebetween.

In this regard, FIG. 4 also illustrates how the gasket member may be configured for resiliently grippingly engaging the outer surface or body of the collector-receiving portion of the mounting member to achieve preassembly thereof with the preassembled mounting member and collector member, if desired. Further keying or engagement means for engaging and orienting the gasket relative to the mounting member may also be provided as will be described later herein.

In order to further define the fully assembled condition of the assembly 10 of the invention relative to the headlamp assembly 12, the mounting member 32 includes resilient, radially outwardly projecting locking means or members 60, 62. These members 60, 62 generally define rearwardly facing shoulder portions for engagement with the inner surface 14 of the housing 16 generally about through aperture 22 therein. Preferably, sloped or ramp-like lead-in surfaces 61, 63 are provided at leading ends of locking means 60, 62 to travel through aperture 22 and engage surface 14 in a resilient, "snap-in" fashion. Preferably, the projecting locking means or members 60, 62 are provided at diametrically opposed sides of the generally tubular hollow body 42 of the mounting member, and are further defined by elongate, open-ended slots 64, 64a, 66, 66a (see also FIGS. 4 and 6). This construction permits the locking members to be resiliently inwardly deformable during assembly of the mounting member with the mounting aperture 22.

In this regard, this initial assembly with mounting aperture 22 would be accomplished with the subassembly in the condition illustrated in FIG. 4; that is, with the collector member advanced only as far as its previously defined "preassembled" condition. Immediately after the initial engagement of the locking means or members with internal wall surface 14, the collector member 30 is axially advanced to its second or fully assembled condition. In this condition, it will be noted that the body or external surface of the collector member now abuts the inner surfaces of the respective locking members 60, 62, preventing inward deformation or compression thereof to thereby resist axial movement of the assembly 10 in the opposite direction, as for disassembly.

Moreover, it should be noted that the locking members 60, 62 and the gasket-engaging member or portion 44 are aligned in a generally parallel and spaced-apart condition. This spacing is such as to assure the desired degree or amount of compression of the gasket 34 by the gasket-engaging surface 44, when the mounting member is advanced sufficiently to secure engagement of locking members 60, 62 with the interior wall surface 14.

In accordance with an alternative embodiment shown in FIGS. 6 and 7, the mounting member 31, and specifically the locking means or members 60, 62 may further include outwardly projecting, crushable rib members in the form of relatively narrow thin, short rib-like projections 70, 72 generally at trailing edges thereof. These crushable rib members generally engage with the interior of the mounting aperture 22 and adjacent surface 14 upon advancement of the locking means therethrough and into snapping engagement thereabout. Thereafter, upon advancement of the collector member to the fully assembled condition, these ribs are crushably deformed, as best viewed in FIG. 7. The deformed ribs tend to take up any play so as to further lock the respective facing surfaces about aperture 22 and facilitate the resistance of the mounting member to any further axial or rotational movement relative to the mounting aperture 22. This further assures that the assembly 10 of the invention will remain substantially in its desired orientation relative to the headlamp assembly 12 and particularly bulb or filament 20, upon assembly therewith, substantially without regard for vibration or other like forces experienced while in service. Advantageously, the crushable ribs generally serve to take up or fill in any slight manufacturing tolerances which might exist between the parts to insure the firm engagement therebetween as desired.

In order to further assure the assembly of the collector and mounting members in the desired relative orientation, the shoulder 50 defines a radially inwardly extending flat or flatted surface or keying surface 76 with respect to the hollow interior surface 42. Cooperatively, an alignable, generally flatted keying surface 78 is defined (best seen in FIG. 5), generally along the same side of collector member 30 as the previously mentioned preassembly and full assembly-defining tab and notch members 52, 54. Hence, the collector member 30 can only freely enter the mounting member in the proper orientation; that is, with flats 78 and 76 in alignment.

In accordance with the embodiment illustrated in FIG. 5, the previously mentioned keying or alignment surfaces or portions of the gasket 34 and gasket-engaging portion or surface 44 are illustrated. As viewed in FIG. 5, it will be seen that the gasket has upstanding shoulder or rib members 80, 82 along along opposite side edges of an upper surface 84 thereof. These ribs face and embrace the gasket-engaging surface of member or portion 44. Advantageously, the surface 84 as defined by ribs 80, 82 and the abutting surface of portion 44 are both of complementary irregular shape, and in the illustrated embodiment, generally trapezoidal. Hence, improper alignment and assembly thereof is generally discouraged by this trapezoidal configuration and ribs 80, 82.

Moreover, the gasket preferably has an upper, upwardly projecting peripheral rim 86 of generally V-shaped cross-sectional configuration for engagement and deformation against gasket-engaging surface of portion 44, to assure sealing therebetween and about the collector-receiving tubular portion 42 of the mounting member 32. Additionally, the keying or aligning means also may include a pair of inwardly projecting, undercut, resilient gripping finger-like members 88, 90 at generally offset positions to either side of the gasket 84 and projecting inwardly inner side surfaces of the ribs 80, 82.

Cooperatively, these fingers 88, 90 engage complementary formed keyed slots 92, 94 provided therefor to either side of and similarly offset with respect to gasket-engaging portion 44 of the mounting member 32.

Additionally, the gasket 34 is provided with a novel dual-acting sealing surface for defining a pair of peripheral seals about the mounting aperture 22. The two seals are defined by respective inner and outer peripheral sealing surfaces, such that the two sealing surfaces generally act as back-ups, one relative to the other. In this regard, the gasket 34 undersurface, or sealing surface, includes a generally flat base or surface portion 96. The first or inner sealing surface 98 comprises an outwardly flared skirt portion, as best viewed in FIG. 4. The outer sealing surface comprises a relatively thin, projecting, continuous lip 100, about the entire periphery of the gasket base portion.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A photo-optic collector assembly for use with an automobile headlamp assembly or the like, and comprising:

a collector member for receiving and redirecting light outwardly of said automobile headlamp assembly or the like;

a mounting member including means for engaging said collector member and means for removably mounting said collector member to extend through a mounting aperture in said headlamp assembly or the like; and wherein said collector member and said mounting member include first and second cooperating assembly means for engaging said collector member with said mounting member, said first assembly means being selectively engageable for engaging the collector member and mounting member in a preassembled condition for shipping and handling thereof; and the second assembly means being selectively engageable for mounting said collector member to said mounting member and for assembling the mounting member and collector member to said headlamp assembly, respectively, in a fully assembled condition.

2. An assembly according to claim 1 and further including a gasket member engageable intermediate a portion of said mounting member and said headlamp assembly or the like for forming a substantially watertight seal about said mounting aperture.

3. An assembly according to claim 2 wherein said mounting member includes an elongate tubular, open-ended body of complementary configuration for receiving said collector member therethrough in releasable engagement therewith and a gasket engaging portion, and further includes resilient, radially outwardly projecting locking members for engagement with an interior wall surface of said headlamp assembly surrounding said mounting aperture.

4. An assembly according to claim 3 wherein said locking members are located relative to said gasket engaging portion for compressing the gasket into sealing engagement with an exterior surface of said headlamp assembly, upon engagement of said locking members with said interior wall surface of said headlamp assembly.

5. An assembly according to claim 3 wherein said locking members are inwardly compressible when said collector member and said mounting member are in said preassembled condition so as to permit insertion of said mounting member through said mounting aperture for snapping engagement of said locking members relative to said interior wall surface of said headlamp assembly, with movement of said collector member to said assembled condition resulting in abutment of said collector member with inner surfaces of said locking means so as to prevent inward compression thereof for preventing disassembly thereof relative to said mounting aperture.

6. An assembly according to claim 1 wherein said cooperating assembly means comprise complementary interlocking tab means and recess means on predetermined ones of facing surfaces of said mounting member and said collector member respectively for defining first and second detented positions thereof corresponding respectively to said preassembled and said fully assembled conditions.

7. An assembly according to claim 1 wherein said mounting member further includes outwardly projecting, crushable rib members positioned for engaging said mounting aperture upon assembly of said mounting member therewith, and responsive to advancement of said mounting member and collector member to said fully assembled condition for crushably deforming so as to facilitate resistance of said mounting member against both axial and rotational movement relative to said mounting aperture.

8. An assembly according to claim 1 and further including cooperating alignable keying surfaces on both said collector member and said mounting member for aligning the two in a predetermined relative orientation to facilitate assembly thereof in a desired relative orientation.

9. An assembly according to claim 2 wherein said mounting member comprises a generally tubular collector-receiving portion and a relatively enlarged gasket-engaging surface portion extending generally transversely of said collector-receiving portion.

10. An assembly according to claim 3 wherein said gasket engaging portion comprises a relatively enlarged surface portion extending generally transversely of said collector-receiving portion.

11. As assembly according to claim 10 wherein said gasket-engaging surface portion is spaced from said locking members by a predetermined distance for causing compression of said gasket for sealing thereof between said gasket-engaging surface and a facing exterior surface of said headlamp assembly or the like about said mounting aperture thereof when said mounting member is advanced relative to said mounting aperture for engaging said locking members with said interior surface of said headlamp assembly or the like.

12. An assembly according to claim 9 wherein said gasket-engaging surface and said gasket have respective cooperating keying means for facilitating engagement thereof in a predetermined, desired relative orientation.

13. An assembly according to claim 9 wherein said gasket includes an outer peripheral sealing surface for defining a first peripheral seal about said mounting aperture and an inner sealing surface for defining a second peripheral seal relative to said mounting aperture, said first and second sealing surfaces being oriented in surrounding relation to said mounting member tubular collector-receiving portion.

14. An assembly according to claim 13 wherein said gasket includes a generally flat base portion and wherein said inner sealing surface comprises an outwardly flared skirt portion extending from said base portion.

15. An assembly according to claim 14 wherein said outer sealing surface comprises a relatively thin, projecting, continuous lip about the entire periphery of said gasket base portion.

16. A photo-optic collector assembly for use with an automobile headlamp assembly or the like, and comprising:
a collector member for receiving and redirecting light outwardly of said automobile headlamp assembly or the like; a mounting member including means for engaging said collector member and means for removably mounting said collector member to extend through a mounting aperture in said headlamp assembly or the like; a gasket member engageable intermediate a portion of said mounting member and said headlamp assembly or the like for forming a substantially watertight seal about said mounting aperture wherein said mounting member includes an elongate tubular, open-ended body of complementary configuration for receiving said collector member therethrough in releasable engagement therewith and a gasket-engaging portion, and further includes resilient, radially outwardly projecting locking members for engagement with an interior wall surface of said headlamp assembly surrounding said mounting aperture; and wherein said locking members are located relative to said gasket-engaging portion for compressing the gasket into sealing engagement with an exterior surface of said headlamp assembly, upon engagement of said locking members with said interior wall surface of said headlamp assembly.

17. An assembly according to claim 16 wherein said collector member and said mounting member include first and second cooperating assembly means for engaging said collector member with said mounting member, said first assembly means being selectively engageable for engaging the collector member and mounting member in a preassembled condition for shipping and handling thereof; and the second assembly means being selectively engageable for mounting said collector member to said mounting member and for assembling the mounting member and collector member to said headlamp assembly, respectively, in a fully assembled condition.

* * * * *